United States Patent
Zimmer et al.

(10) Patent No.: US 7,380,136 B2
(45) Date of Patent: May 27, 2008

(54) METHODS AND APPARATUS FOR SECURE COLLECTION AND DISPLAY OF USER INTERFACE INFORMATION IN A PRE-BOOT ENVIRONMENT

(75) Inventors: Vincent J. Zimmer, Federal Way, WA (US); Michael A. Rothman, Gig Harbor, WA (US)

(73) Assignee: Intel Corp., Santa Clara, CA (US)

( * ) Notice: Subject to any disclaimer, the term of this patent is extended or adjusted under 35 U.S.C. 154(b) by 725 days.

(21) Appl. No.: 10/606,144

(22) Filed: Jun. 25, 2003

(65) Prior Publication Data
US 2004/0268135 A1   Dec. 30, 2004

(51) Int. Cl.
*H04L 9/32* (2006.01)
*H04L 9/00* (2006.01)
*G06F 9/00* (2006.01)

(52) U.S. Cl. .................... 713/193; 713/2; 713/194; 726/5; 726/21

(58) Field of Classification Search ............... None
See application file for complete search history.

(56) References Cited

U.S. PATENT DOCUMENTS

| | | | | |
|---|---|---|---|---|
| 5,892,906 | A * | 4/1999 | Chou et al. ............. | 713/2 |
| 5,937,063 | A | 8/1999 | Davis ................... | 380/4 |
| 6,327,652 | B1 * | 12/2001 | England et al. .......... | 713/2 |
| 6,327,660 | B1 * | 12/2001 | Patel .................. | 713/193 |
| 2003/0061497 | A1 | 3/2003 | Zimmer ................ | 713/189 |
| 2004/0103299 | A1 * | 5/2004 | Zimmer et al. .......... | 713/200 |
| 2004/0128425 | A1 * | 7/2004 | Zitlaw et al. ........... | 711/1 |

OTHER PUBLICATIONS

Extensible Firmware Interface Home. Website [online]. Intel Corporation. Prior Art [retrieved on May 10, 2004]. Retrived from the internet <http://developer.intel.com/technology/efi/>. pp. 1-2.
Extensible Firmware Interface Specification, Intel Corporation, Version 1.10, Dec. 1, 2002, 1084 pages.
Extensible Firmware Interface Specification, Version 1.10, Specification Update, Intel Corporation, Version -001. Nov. 26,2003, 63 pages.

* cited by examiner

*Primary Examiner*—Gilberto Barron, Jr.
*Assistant Examiner*—Laurel Lashley
(74) *Attorney, Agent, or Firm*—Hanley, Flight & Zimmerman, LLC

(57) ABSTRACT

Methods and apparatus for secure collection and display of user interface information in a pre-boot environment are disclosed. A disclosed system executes trusted software under a secure mode of a processor. In the secure mode, the processor may directly access an area of memory that normally cannot be accessed. One or more software routines, device drivers, digital certificates, hash codes, encryption keys, and/or any other data may be stored in the secure area of memory. Software routines and device drivers stored in the secure area of memory and/or certified by data in the secure area of memory may be "trusted." Preferably, trusted software routines and/or device drivers are digitally signed by a trusted source (e.g., Microsoft). In addition to trusted interface objects, the pre-boot environment may include non-trusted interface objects. These non-trusted interface objects may use third party software routines and/or device drivers. Accordingly, both trusted and non-trusted interface objects may be used in the same pre-boot interface.

28 Claims, 7 Drawing Sheets

METHODS AND APPARATUS FOR SECURE COLLECTION AND DISPLAY OF USER INTERFACE INFORMATION IN A PRE-BOOT ENVIRONMENT

TECHNICAL FIELD

The present disclosure pertains to computer systems and, more particularly, to methods and an apparatus for secure collection and display of user interface information in a pre-boot environment.

BACKGROUND

As more people use their computers for more functions in their lives (e.g., storing private data, banking, shopping, etc.), the need for improved computer security measures increases. Unauthorized access to a computer may be prevented using a variety of protection schemes such as magnetic key cards, passwords, etc.

However, most of these computer protection schemes rely, at least in part, on software running on the protected computer. For example, a magnetic key card reader may require a device driver and an input routine to be executed by the computer. This device driver and input routine must be loaded when the computer is powered up.

A computer protection scheme that relies on software running on the protected computer is susceptible to "spoofing" and other deceptive software attacks. For example, a dialog box asking a user for a password may actually be generated by a virus program designed to collect the password for disclosure to an unauthorized user.

Prior to loading a full operating system with a graphical user interface (e.g., Microsoft Windows®), most computers are capable of presenting a text-based user interface and/or a limit graphics interface in a pre-boot environment. For example, most DOS (Disk Operating System) based systems enter a text-based environment if the F2 key is pressed during start up.

In order to protect this pre-boot environment, the user may be required to enter a basic input/output system (BIOS) password. Frequently, people use the same password for multiple purposes. In such an instance, a disclosure of the BIOS password may open a user up to additional unauthorized access such as bank accounts, etc.

DETAILED DESCRIPTION

Generally, the disclosed system executes one or more software routines in a pre-boot environment (i.e., before an operating system is loaded) under a secure mode of a processor. The secure mode is at the hardware level of the processor. In the secure mode, the processor may directly access an area of memory that normally cannot be accessed. A memory management unit associated with the processor is unable to access the secure area of memory. One or more software routines, device drivers, digital certificates, hash codes, encryption keys, and/or any other data may be stored in the secure area of memory. Software routines and device drivers stored in the secure area of memory and/or certified by data in the secure area of memory may be "trusted." Preferably, trusted software routines and/or device drivers are digitally signed by a trusted source (e.g., Microsoft Corporation). For example, in order to collect a BIOS password in a pre-boot environment, a trusted BIOS password collection routine may call a trusted graphics routine to present a dialog box prompting a user for a password. The trusted graphics routine may call a trusted display driver in order to generate the password entry dialog box. Similarly, the dialog box may accept password input via a trusted keyboard driver.

The use of a Secure Virtual Machine Monitor (SVMM) and trusted hardware allows for the existence of a "Trusted Path", or channel that cannot be usurped. A trusted path for input may consist of an input device whose control and status registers (CSR's) are only available to the SVMM. Access from non-SVMM agents are precluded by the memory and input/output (I/O) protection mechanism. Similarly, the trusted path for output may be of a video device whose control and status registers (CSR's) are only available to the SVMM.

In one embodiment, the secure pre-boot execution environment may be implemented in firmware conformant to the Extensible Firmware Interface (EFI) Specification, version 1.02, published Dec. 12, 2000 by Intel Corporation, Santa Clara, Calif. Many of the example commands used herein are from the EFI specification and/or other specifications. These specific examples are being used merely for the purpose of illustration.

A secure pre-boot execution environment of a computer system in accordance with one embodiment may be used to perform secure operations, for example, secret storage and subsequent access to the secret; this is also known as secure or isolated storage. As used herein, "secret" means any information (whether data, instruction or other) that is kept hidden from the computer system and user when not in the secure pre-boot environment. For example, such secrets may include keys, passwords, financial information, medical records and the like. Also, the secure pre-boot mode may be used for isolated execution. This provides a means to segregate untrusted, errant or malicious code (collectively "harmful code") from other trusted, verifiable code.

Figure 1:
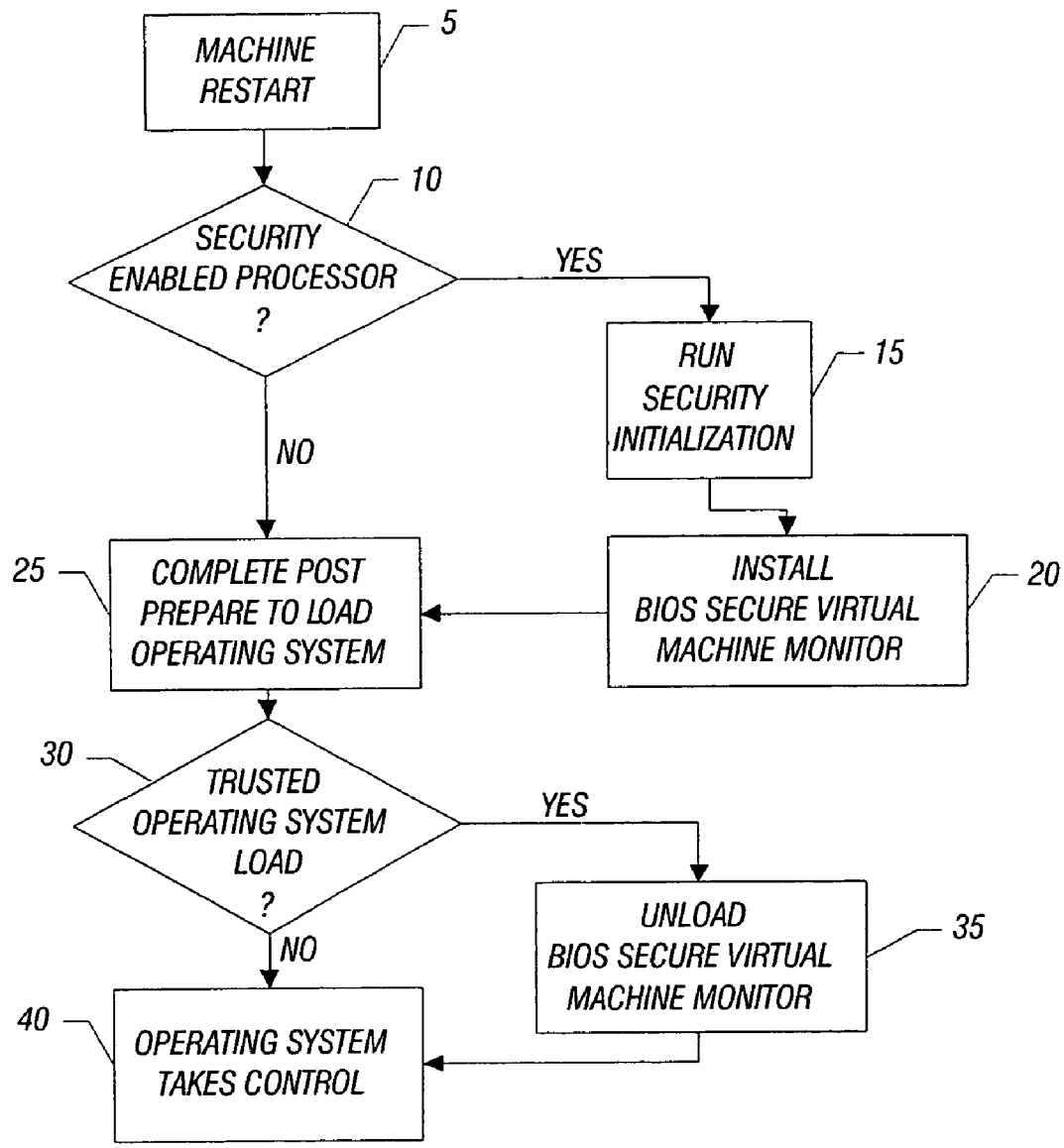
FIG. 1 is a flowchart representative of example machine readable instructions which may be executed by a device to implement an example method of loading a basic input/output system (BIOS) secure virtual machine monitor (VMM).

FIG. 1 is a flow diagram of an example program flow for loading a basic input/output system (BIOS) secure virtual machine monitor (VMM). As shown in FIG. 1, upon restart of a computer system (block 5), firmware determines whether a CPU has the ability to accommodate secure pre-boot mode operation, that is, whether the CPU is security enabled (diamond 10). If such a CPU is present, security initialization software may be run (block 15). Next, BIOS Secure Virtual Machine Monitor (SVMM) may be installed (block 20) and a SVMM pre-boot environment may be entered. As used herein, the term "Secure Virtual Machine Monitor" or "SVMM" means a secure environment in which one or more operating environments exist on a single platform. While in the SVMM, any desired secure operations, such as secret storage/access, flash memory updates, and the like, may be performed.

It is to be understood that a "Virtual Machine" is not required; rather, the software may be a Secure Monitor, where the "Monitor" aspect speaks to the ability to detect and qualify access of untrusted code. In certain embodiments, the SVMM may form a Trusted Computing Base (TCB); a TCB is a small, verified subset of code that can be isolated from and control behavior of the rest of the code. A TCB may be designed to be small in order to have a formal, third party review of the security and safety attributes.

Next, or if a secure mode processor is not available, power on self test (POST) may be completed and the pre-boot environment is prepared to load the OS (block 25). It is determined then whether a trusted OS load is possible (diamond 30). If such a load is possible, the BIOS SVMM is unloaded (block 35). Either way, the OS may then take control of the computer system (block 40).

It is to be understood that the early invocation of a secure CPU operational mode is not limited to a Virtual Machine Monitor (VMM) design such as the SVMM, but may be used in connection with other CPU security modes.

Figure 2:
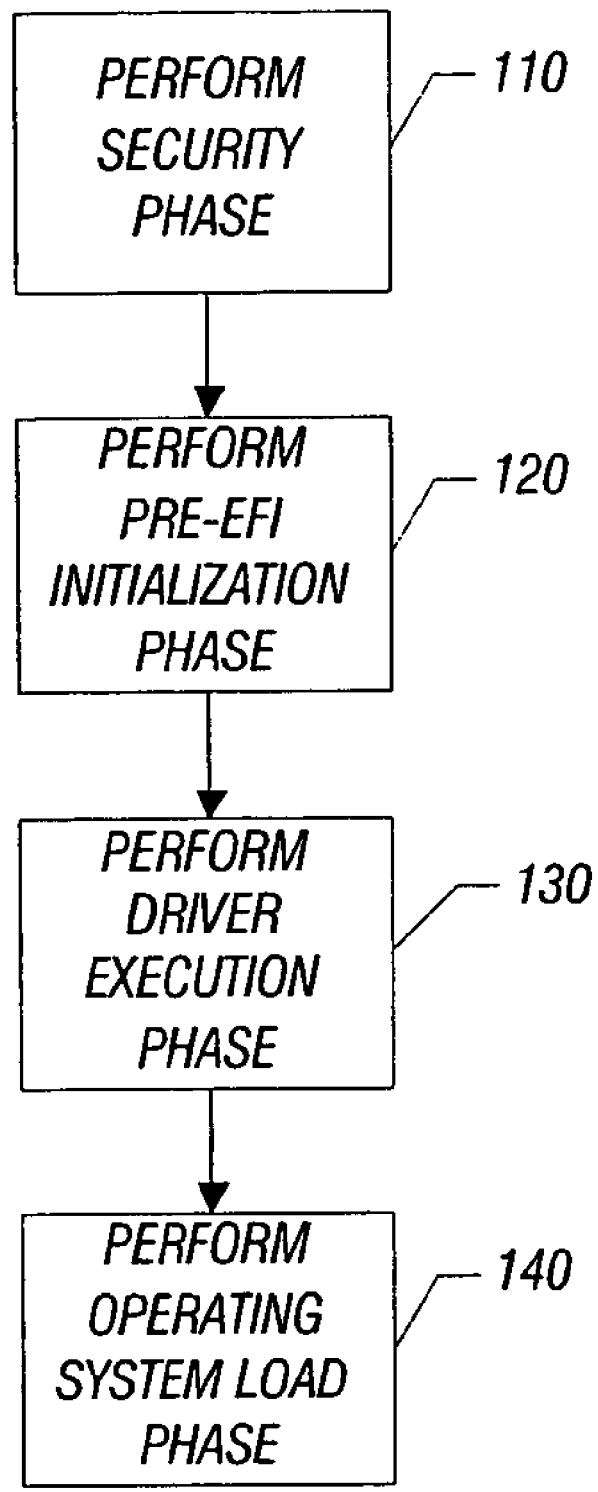
FIG. 2 is a flowchart representative of example machine readable instructions which may be executed by a device to implement an example firmware operation.

In one embodiment, firmware may perform pre-boot operations in a series of phases. FIG. 2 is a flow diagram of an example firmware operation. As shown in FIG. 2, upon machine start or restart, a security phase may be performed (block 110). In the security phase, initial operations after platform reset or power on may be performed to ensure that firmware integrity is intact. Next, a pre-EFI (PEI) initialization phase may be performed (block 120). In the PEI phase, code may perform minimal processor chipset and platform configuration to support memory discovery.

Next, a driver execution (DXE) phase may be performed (block 130). It is in this phase that a majority of the firmware code may operate in the pre-boot environment. In one embodiment, the code may be implemented as a number of drivers, which complete initialization of the platform and devices. Finally, an operating system load phase may be performed (block 140). In this phase, the operating system is loaded and at the conclusion of this phase the operating system takes control of the platform.

In one embodiment, the firmware may launch a Virtual Machine Monitor (VMM) driver. This driver may publish an instance of the VMM protocol. In certain embodiments, the driver may be launched early in the DXE phase and may perform a command to access a secure environment launch (e.g., a SENTER command).

In one embodiment, the VMM driver may materialize a SVMM, which in certain embodiments may have scalable capabilities. The scalability stems from the ability of the VMM driver to allow loading of subsequent drivers into a secure execution mode (referred to herein as "virtual machine extensions" or "VMX"). In certain embodiments, the SVMM may execute in a highest privilege level (e.g., Ring0P in an IA32 processing system). Any subsequently loaded drivers may execute in a lower privilege level (e.g., Ring3P in an IA32 processing system). Further, any other code designed to run in the secure pre-boot environment, such as guest-hosted system management mode (SMM) drivers and the like, may also execute in Ring 3P.

In various embodiments, these subsequent drivers may be launched via an authenticated driver load mechanism to ensure that only trusted drivers are loaded into the secure pre-boot environment managed by the SVMM. In one such embodiment, the authentication process may include use of a public key infrastructure (PKI) to ensure that only trusted drivers are loaded into the VMX environment. Alternately, core root-of-trust maintenance may be used to launch the SVMM, including but not limited to a transitive trust handoff from a reset vector to the security phase to the PEI phase and into the DXE phase, as described above.

The SVMM driver that publishes the VMM protocol may have several roles in certain embodiments. First, it may be the first agent on a platform to issue the SENTER command, thus it may also become responsible for receiving subsequent system management interrupt (SMI) activations. In certain embodiments, for example, legacy operating systems, this role may be maintained during OS runtime, whereas in other embodiments (e.g., EFI-aware OS's) this role may be transitioned to an operating system-provided SVMM.

In certain embodiments, the SVMM may load additional VMX drivers. These drivers may be code sequences that desire to take advantage of the isolated storage and execution attributes of VMX; these drivers may include a BIOS integrity services driver available from Intel Corporation; authentication services, such as Kerberos available from Massachusetts Institute of Technology, Cambridge, Mass.; or other security code, such as pre-boot implementations of cryptographic algorithms, such as agents that perform asymmetric cryptographic computations, for example Rivest Shamir Adleman (RSA) available from RSA Security, Bedford, Mass. The point of isolating the aforementioned code is that the integrity of the code (i.e., not having been tampered with) is desired to satisfy the security assertions of the driver behavior.

Figure 3:
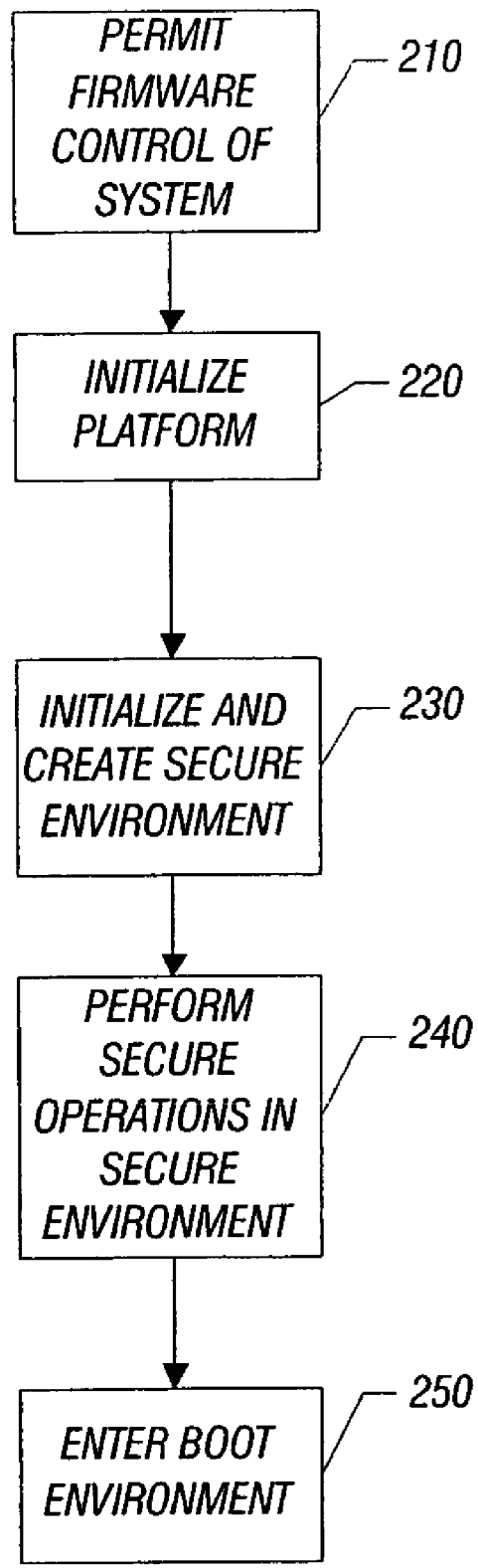
FIG. 3 is a flowchart representative of example machine readable instructions which may be executed by a device to implement an example pre-boot environment.

Referring now to FIG. 3, shown is a flow diagram of the operation of a pre-boot environment. As shown in FIG. 3, firmware is provided control of the system (block 210). Such control may occur upon power up, via a system state (e.g. S3 sleep state) event or otherwise. Next, the platform may be initialized (block 220). In certain embodiments, such initialization may include minimal configuration of the processor, chipset and memory.

Next, as shown in FIG. 3, a secure environment may be initialized and created (block 230). Such initialization may include obtaining the secure code from a persistent memory device. In one embodiment, the secure code may be stored in a flash memory device that is permanently secured to a motherboard of the system. Because this code is stored in a persistent memory device and is known as a secure device, the pre-boot environment has a level of integrity. Furthermore, in one embodiment the initialization may include performing code in the chipset to ensure that the chipset is in a permissible state for secure pre-boot operation. In one embodiment, the secure initialization may be accomplished by performing a load SINIT command.

Creating the secure environment, in one embodiment, may include generating a digest in a fixed token (discussed further below) which provides information about the platform in the secure environment. Furthermore, creating the secure environment may include setting up a memory stack. In one embodiment, the secure environment may be created by loading a SVMM, as discussed above.

Next, secure operations may be performed in the pre-boot environment (block 240). As discussed herein, such operations may include sealing and unsealing of secrets using a fixed token, for example. Another use of the secure environment may be to update the flash memory. Further, such operations may include performance of secure or trusted drivers and attestation logs/signatures. Such attestation of signatures may be handed off to a challenger, for example.

When desired operations in the pre-boot environment have been performed, the boot environment may be entered (block 250). In one embodiment, a transitive handoff from the secure pre-boot environment to a trusted OS environment may be provided. In other embodiments, the secure pre-boot environment may be torn down prior to OS launch. Alternately, in other embodiments a boot environment may be entered with the secure mode maintained in the background for performing or maintaining platform integrity, for example. While discussed in reference to a single processor, in other embodiments a multiple processor environment (logical or real) may be present.

In one embodiment, the secure pre-boot environment may maintain a secret, which then may be used by platform firmware. On a first launch, the secure pre-boot environment may generate such a secret in the form of a root key, suitable to algorithms and protocols supported by the secure pre-boot environment. Once generated, this root key may be protected so that the protected root key will only be released to the same secure pre-boot environment running on the same platform.

This protection may be accomplished by use of a Trusted Computing Platform (TCP) (or an equivalent hardware "safe") in certain embodiments. In one embodiment, the secure pre-boot environment's root key may be sealed using fixed token facilities. In one embodiment, a fixed token facility may be a chip affixed to the motherboard of the computer system and in communication with the CPU, as will be discussed further below.

In one embodiment, the generation of a secret may be accomplished using a seal operation that encrypts both the root key and the registered identity of the secure pre-boot environment, using a key accessible only to the fixed token. This encrypted data ("key blob") may then be stored in mass storage (e.g., a hard drive of the computer system). When the secure pre-boot environment is launched, for example during a subsequent platform boot, the key blob may be returned to the fixed token, which decrypts it and compares it to the identity registered for the current secure pre-boot environment. If the current secure pre-boot environment identity matches the identity embedded in the key blob, then the root key is released to the secure pre-boot environment.

In one embodiment, the seal operation allows software to explicitly state the future "trusted" configuration that the platform must be in for the secret to be revealed. The seal operation also implicitly includes the relevant platform configuration (i.e., platform configuration register (PCR) values) when the seal operation was performed. The seal operation may use a preselected value to bind the blob to an individual TCP.

If the unseal operation succeeds, proof of the platform configuration that was in effect when the seal operation was performed may be returned to the caller, as well as the secret data.

In certain embodiments, the secure pre-boot environment may also allow for a scale-out design where additional security capabilities and support can be provided via loadable drivers. In one embodiment, the drivers may be EFI runtime drivers. These drivers may include, but are not limited to, secure storage interfaces and drivers for secure code execution. Such drivers may provide user-authentication, remote image integrity challengers, and attested boot, all within a hardened environment.

In one embodiment, the secure pre-boot environment may secure the system management base address (SMBASE) so that no other pre-boot component can perform the SENTER and thus have visibility into the system management random access memory (SMRAM).

Thus, in such an embodiment, the secure pre-boot environment may receive any SMI activations after launch. By the early launch of secure pre-boot environment, the ability of rogue software performing a SENTER and having the ability to see into SMRAM is reduced because of the associated system management mode memory (SMMEM) activation.

In various embodiments, the secure pre-boot environment may have several unload options. For an EFI-aware OS boot, the secure pre-boot environment may tear-down the secure environment. Alternately, the secure pre-boot environment may stay in place until some later "unload" service is invoked.

For example, the secure pre-boot environment may provide a managed hand-off to an OS SVMM. This presents an opportunity to establish a root of trust from pre-boot that may be transferred unbroken to the operating system, providing additional assurance about the stability of the platform beyond that which the OS can derive from loading its own SVMM upon boot up, and greater assurance on the origin of platform SMM code that will persist into the operating system runtime under the control of an OS SVMM.

In various embodiments, the present invention may provide a secure operating environment for code in the pre-boot space. Such an environment offers opportunities to change the way operations that are critical to platform integrity are handled, expanding the platform design envelope and improving user experience.

For example, in the secure pre-boot environment, a flash memory update may be performed without forcing an "init" command, since write access to the flash memory may be opened by trusted code running inside the secure pre-boot environment. Specifically, memory-management unit operations that provide for security, which may include but are not limited to page-level protections, may be established by an SVMM in order to qualify access to the flash-region only to trusted parties. These parties may include but are not limited to the platform-owner update code.

In another embodiment, a flash memory update may be performed by a trusted OS in a boot environment. In such an embodiment, the CPU while in the secure pre-boot environment may protect the flash memory region via page level protection mechanisms. When a transitive hand off occurs from the secure pre-boot environment, the same protected memory regions may be provided to the OS. Thus while in a boot environment, the protected memory (i.e., flash memory) may be accessed and updated accordingly.

In certain embodiments the SVMM may be used during Operating System (OS) runtime, to run alongside the operating system's SVMM. The BIOS SVMM may provide behavior that is platform-specific, such as Reliability-Availability-Serviceability (RAS). These may include handling particular platform errors, such as writing to a physical page of memory that has an Error-Correcting Code (ECC) Single-Bit Error (SBE). An SBE that is detected by the chipset often needs to access a region of memory to read and subsequently write back in order to update the syndrome bits. There is not a standardized way to alert an operating system of this failure and necessary behavior, and during the secure operating system runtime, the OS controls all memory. As such, a peer BIOS SVMM to the OS SVMM provides for platform-specific activities that were formerly done in System Management Mode (SMM); SMM had full access to the system prior to the advent of secure operating systems.

Also, today there is a tacit trust assertion made by operating systems with respect to the platform. For example, BIOS creates tables describing non-enumerable resources, such as the entire memory map, fixed ports, address of the local APIC (Advanced Programmable Interrupt Controller), interrupt routing, and other resources. These tables are only protected by simple checksums. For trusted platforms though, these tables, which are stored in plain memory today, could represent an attack point. The attacker could permute the value describing the platform and lie to the operating system; this attack could include hiding memory, spoofing ports, and the like. A pre-boot environment may be used to generate these tables, sign the contents, transitively hand-off to an OS SVMM with a trust assertion, and the like.

Embodiments may be implemented in a computer program. As such, these embodiments may be stored on a storage medium having stored thereon instructions which can be used to program a computer system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), electrically erasable programmable read-only memories (EEPROMs), flash memories, magnetic or optical cards, or any type of media suitable for storing electronic instructions. Similarly, embodiments may be implemented as software modules executed by a programmable control device. A programmable control device may be a computer processor or a custom designed state machine. Custom designed state machines may be embodied in a hardware device such as a printed circuit board having discrete logic, integrated circuits, or specially designed application specific integrated circuits (ASICs).

Figure 4:
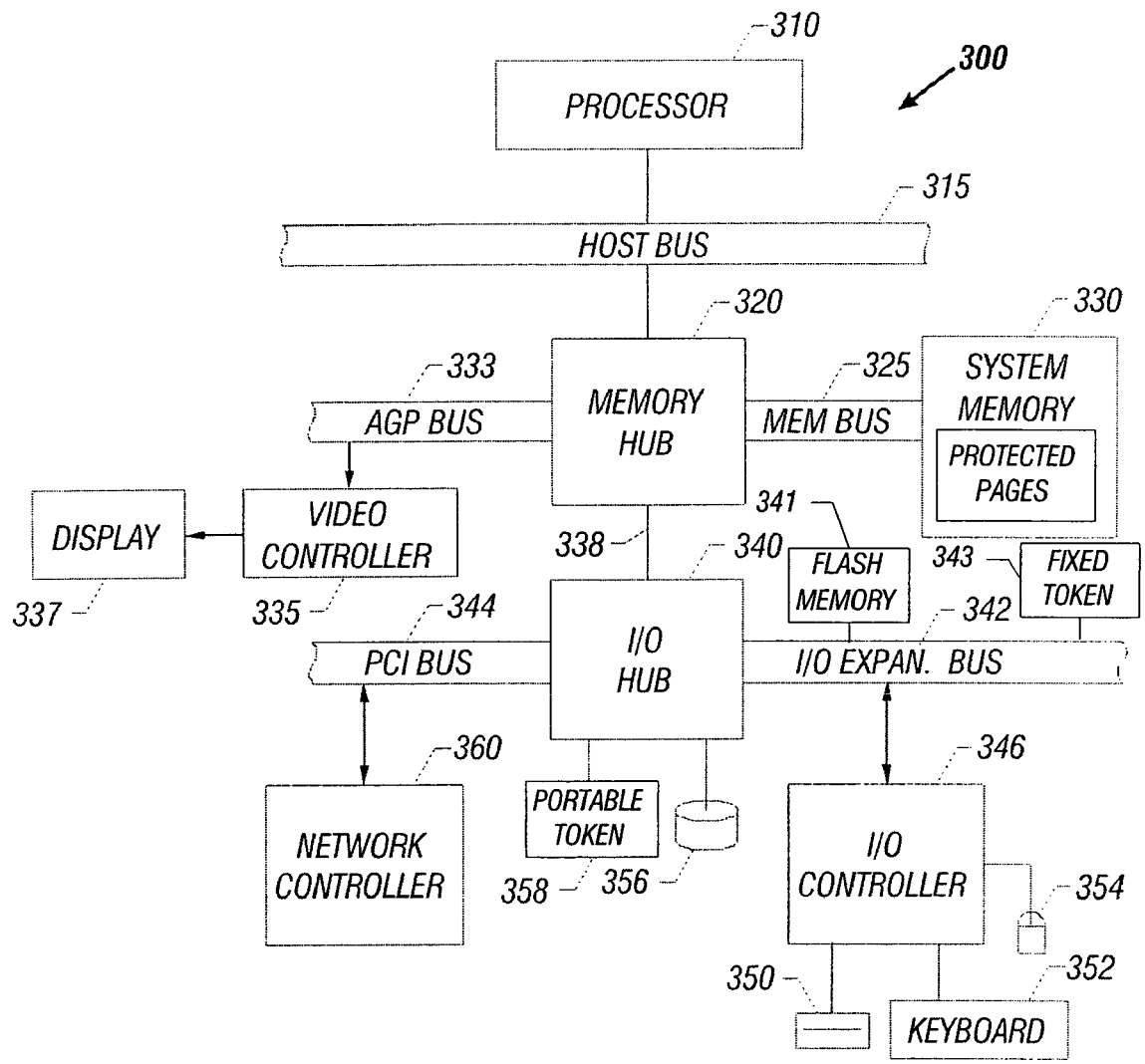
FIG. 4 is a block diagram of an example computer system illustrating an environment of use for the disclosed system.

Example embodiments may be implemented in software for execution by a suitable data processing system configured with a suitable combination of hardware devices. FIG. 4 is a block diagram of a representative data processing system, namely computer system 300 with which embodiments of the invention may be used.

Now referring to FIG. 4, in one embodiment, computer system 300 includes a processor 310, which may include a general-purpose or special-purpose processor such as a microprocessor, microcontroller, ASIC, a programmable gate array (PGA), and the like.

The processor 310 may be coupled over a host bus 315 to a memory hub 320 in one embodiment, which may be coupled to a system memory 330 via a memory bus 325. As shown in FIG. 4, in certain embodiments, system memory 330 may have protected memory pages. Such pages may include, for example, pages related to the SVMM and other trusted virtual machines, among others. In certain embodiments, memory hub 320 may be configured to block access to at least certain portions of the protected memory pages of system memory 330. The memory hub 320 may also be coupled over an Advanced Graphics Port (AGP) bus 333 to a video controller 335, which may be coupled to a display 337. The AGP bus 333 may conform to the Accelerated Graphics Port Interface Specification, Revision 2.0, published May 4, 1998, by Intel Corporation, Santa Clara, Calif.

The memory hub 320 may also be coupled (via a hub link 338) to an input/output (I/O) hub 340 that is coupled to a input/output (I/O) expansion bus 342 and a Peripheral Component Interconnect (PCI) bus 344, as defined by the PCI Local Bus Specification, Production Version, Revision 2.1 dated in June 1995. The I/O expansion bus 342 may be coupled to an I/O controller 346 that controls access to one or more I/O devices. As shown in FIG. 4, these devices may include in one embodiment storage devices, such as a floppy disk drive 350 and input devices, such as keyboard 352 and mouse 354. Also coupled to the I/O expansion bus 242 may be a flash memory 341 which, in one embodiment, may persistently store the secure code for the pre-boot environment. The I/O hub 340 may also be coupled to, for example, a hard disk drive 356 as shown in FIG. 4. It is to be understood that other storage media may also be included in the system.

Also coupled to I/O expansion bus 342 may be a fixed token 343. In one embodiment, fixed token 343 may be permanently bonded to a motherboard of computer system 300. Fixed token 343, which may be a general purpose processor, ASIC, or the like, may have basic so-called "smart card" capabilities. In certain embodiments, these capabilities may include cryptographic abilities such as keys, storage, signing, and encryption. In various embodiments, fixed token 343 may be used for attestation and sealing/unsealing of secrets. Such attestation may include attesting to platform compliance and specific monitor/applets loaded. In sealing secrets, fixed token 343 may be programmed to seal/unseal secrets to the same environment or a selected environment.

In certain embodiments, a portable token 358 may be coupled to I/O hub 340. It is to be understood that such coupling may be by any standard connection such as a universal serial bus (USB), for example. In one embodiment, portable token 358 may have capabilities similar to fixed token 343. For example, portable token 358 may be used to test the system for a user, provide for portable user secrets, provide anonymous identifications, and the like.

In an alternate embodiment, the I/O controller 346 may be integrated into the I/O hub 340, as may other control functions. The PCI bus 344 may also be coupled to various components including, for example, a network controller 360 that is coupled to a network port (not shown).

Additional devices may be coupled to the I/O expansion bus 342 and the PCI bus 344, such as an input/output control circuit coupled to a parallel port, serial port, a non-volatile memory, and the like.

Although the description makes reference to specific components of the system 300, it is contemplated that numerous modifications and variations of the described and illustrated embodiments may be possible. For example, instead of memory and I/O hubs, a host bridge controller and system bridge controller may provide equivalent functions. In addition, any of a number of bus protocols may be implemented.

Figure 5:
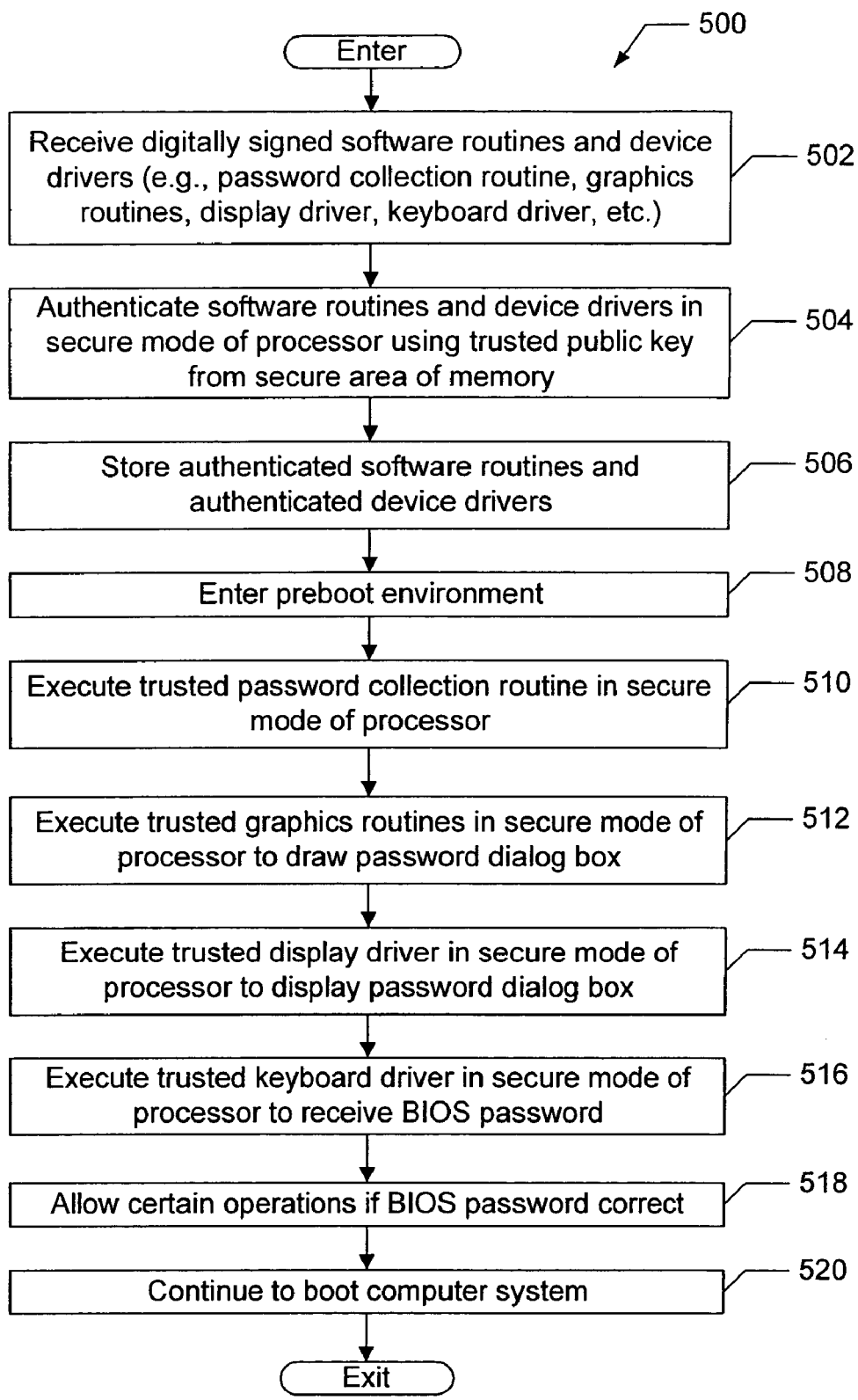
FIG. 5 is a flowchart representative of example machine readable instructions which may be executed by a device to implement an example method of executing both trusted and non-trusted interface objects in the same pre-boot interface.

An example process 500 for executing both trusted and non-trusted interface objects in the same pre-boot interface is illustrated in FIG. 5. Preferably, the process 500 is embodied in one or more software programs which are stored in one or more memories (e.g., flash memory 341 and/or system memory 330) and executed by one or more processors (e.g., processor 310) in a well known manner. However, some or all of the blocks of the process 500 may be performed manually and/or by some other device. Although the process 500 is described with reference to the flowchart illustrated in FIG. 5, a person of ordinary skill in the art will readily appreciate that many other methods of performing the process 500 may be used. For example, the order of many of the blocks may be altered, the operation of one or more blocks may be changed, blocks may be combined, and/or blocks may be eliminated.

In general, the example process 500 executes one or more software routines in a pre-boot environment (i.e., before an operating system is loaded) under a secure mode of a processor. The secure mode is at the hardware level of the processor. In the secure mode, the processor may directly access an area of memory that normally cannot be accessed. A memory management unit associated with the processor is unable to access the secure area of memory. One or more software routines, device drivers, digital certificates, hash codes, encryption keys, and/or any other data may be stored in the secure area of memory. Software routines and device drivers stored in the secure area of memory and/or certified by data in the secure area of memory may be "trusted." Preferably, trusted software routines and/or device drivers are digitally signed by a trusted source (e.g., Microsoft). For example, in order to collect a BIOS password in a pre-boot environment, a trusted BIOS password collection routine may call a trusted graphics routine to present a dialog box prompting a user for a password. The trusted graphics routine may call a trusted display driver in order to generate the password entry dialog box. Similarly, the dialog box may accept password input via a trusted keyboard driver.

The example process 500 begins by receiving one or more digitally signed software routines and/or digitally signed device drivers (block 502). As used herein, a software routine is any machine readable set of instructions, and a device driver is a software routine used to control a hardware device such as a keyboard or a display. A software routine may be digitally signed by passing the software routine through a hash function to create a hash function result. This hash function result can be thought of as "fingerprint" of the software routine. The hash function result is then encrypted using a private key (e.g., a private key belonging to Microsoft) to create a digital signature.

Any type of software routines and/or device drivers may be received. For example, the computer system 300 may receive a digitally signed password collection routine. The password collection routine may cause a password dialog box to be displayed and a keyboard input to be received. In order to assist the password collection routine and/or any other routine, the computer system 300 may receive a digitally signed graphics routine. The graphics routine may be used to draw certain user interface objects, such as a dialog box. Similarly, the computer system 300 may receive a digitally signed display driver. The display driver "talks" to a display device to display text and/or graphics. In addition, the computer system 300 may receive a digitally signed keyboard driver. The keyboard driver "talks" to a keyboard to receive text input (e.g., a password).

Once a digitally signed software routine or device driver is received, the process authenticates the software routine or device driver using a trusted public key (block 504). Specifically, the trusted public key is used to decrypt the digital signature attached to the software routine to recreate the hash function result. The software routine received is then passed through the same hash function to create a second hash function result. If the recreated hash function result matches the second hash function result, the software routine is authenticated. If the public-private key pair is trusted (e.g., it belongs to Microsoft), then the software routine may be trusted.

Figure 6:
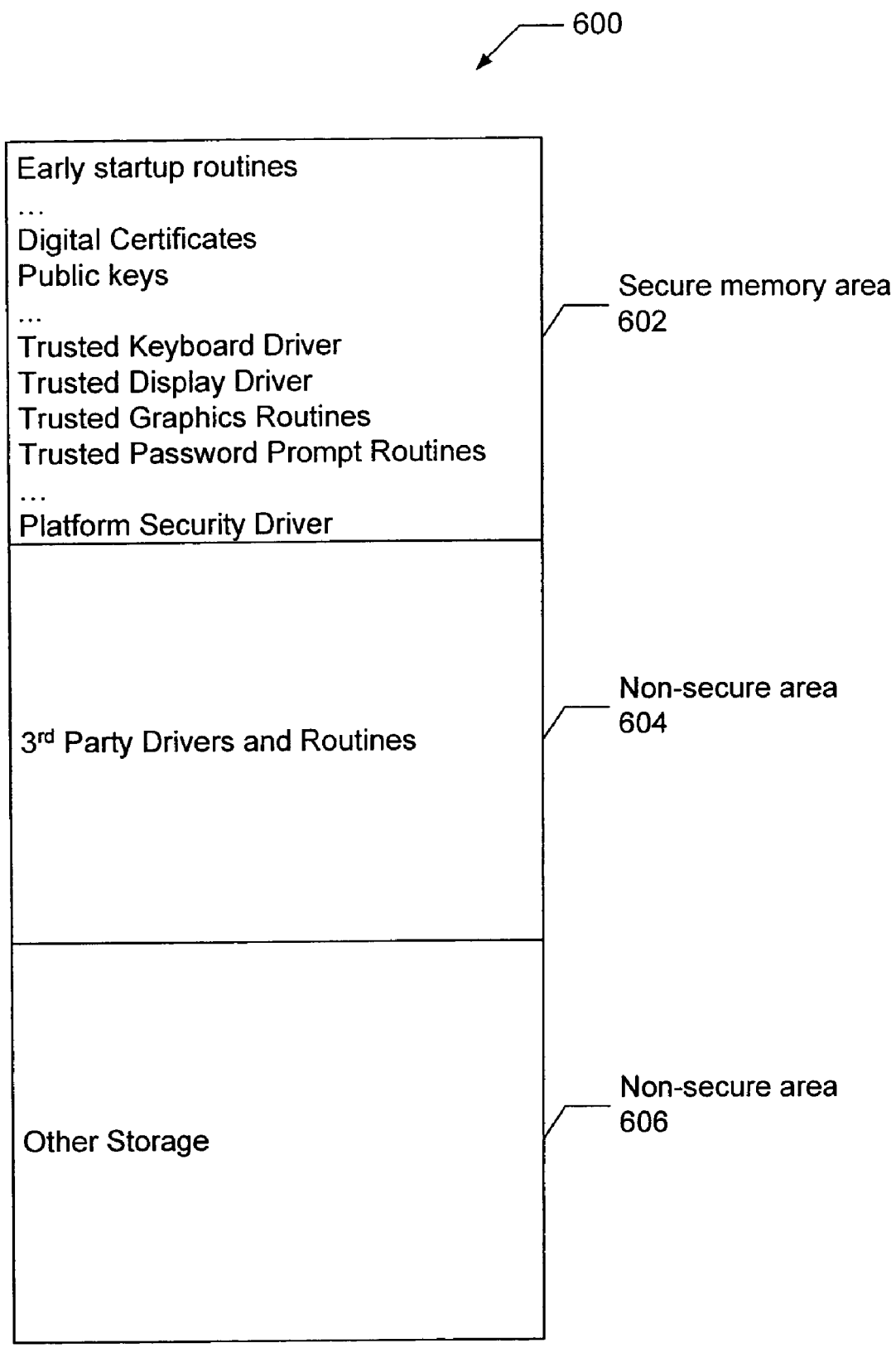
FIG. 6 is an example memory map including a secure memory area.

Preferably, the process authenticates the software routine or device driver in the secure mode of the processor, and the trusted public key is stored in a secure area of memory. A memory map 600 including a secure memory area 602 is illustrated in FIG. 6. The secure memory area 602 is only available at the processor level (e.g., ring −1) when the processor 310 is in the secure mode. The secure memory area 602 is not available to a memory management unit (MMU). Of course, other drivers and routines may also be stored in another area of memory, such as a first non-secure area 604, and the memory may have many different non-secure areas (e.g., area 606). In this manner, the computer system 300 may support both trusted and non-trusted (e.g., legacy) software routines and device drivers.

Returning to FIG. 5, the trusted software routines and device drivers are then stored for later use (block 506). For example, the trusted software routines and device drivers may be used during a boot process. During the boot process, the process 500 enters a pre-boot environment (block 508). A pre-boot environment is an environment in which an intended operating system (OS), such as Microsoft Windows® is not yet running. In the pre-boot environment, drivers may be loaded that enable a user to obtain and change settings for particular devices. The pre-boot environment has limited resources and, therefore, interfaces provided by drivers for the motherboard and the peripherals may be less user friendly and are usually unfamiliar to most users in contrast to the runtime environment provided after an OS is operating (e.g., a Windows® environment).

Entering the pre-boot environment may be initiated by, for example, applying power to the computer system 300. As is known to those having ordinary skill in the art, upon receiving power, the processor 310 experiences a reset condition that causes the processor 310 to execute instructions located in a boot block of the flash memory 341 via a reset vector in the processor 310. The instructions in the boot block impart functionality to the processor 310 and inform the processor 310 of the location of further firmware instructions to be executed by the processor 310. The firmware instructions executed by the processor 310 may be stored in the flash memory 341, a hard drive 356, and/or any other memory device.

Next, the example process 500 attempts to execute the trusted password collection routine in the pre-boot environment (block 510). In one embodiment, the password collection routine is known to be trusted because it is stored in the secure memory area 602. In another embodiment, the password collection routine is known to be trusted because the process 500 authenticates the password collection routine using a digital certificate stored in the secure memory area 602 prior to executing the password collection routine.

Figure 7:
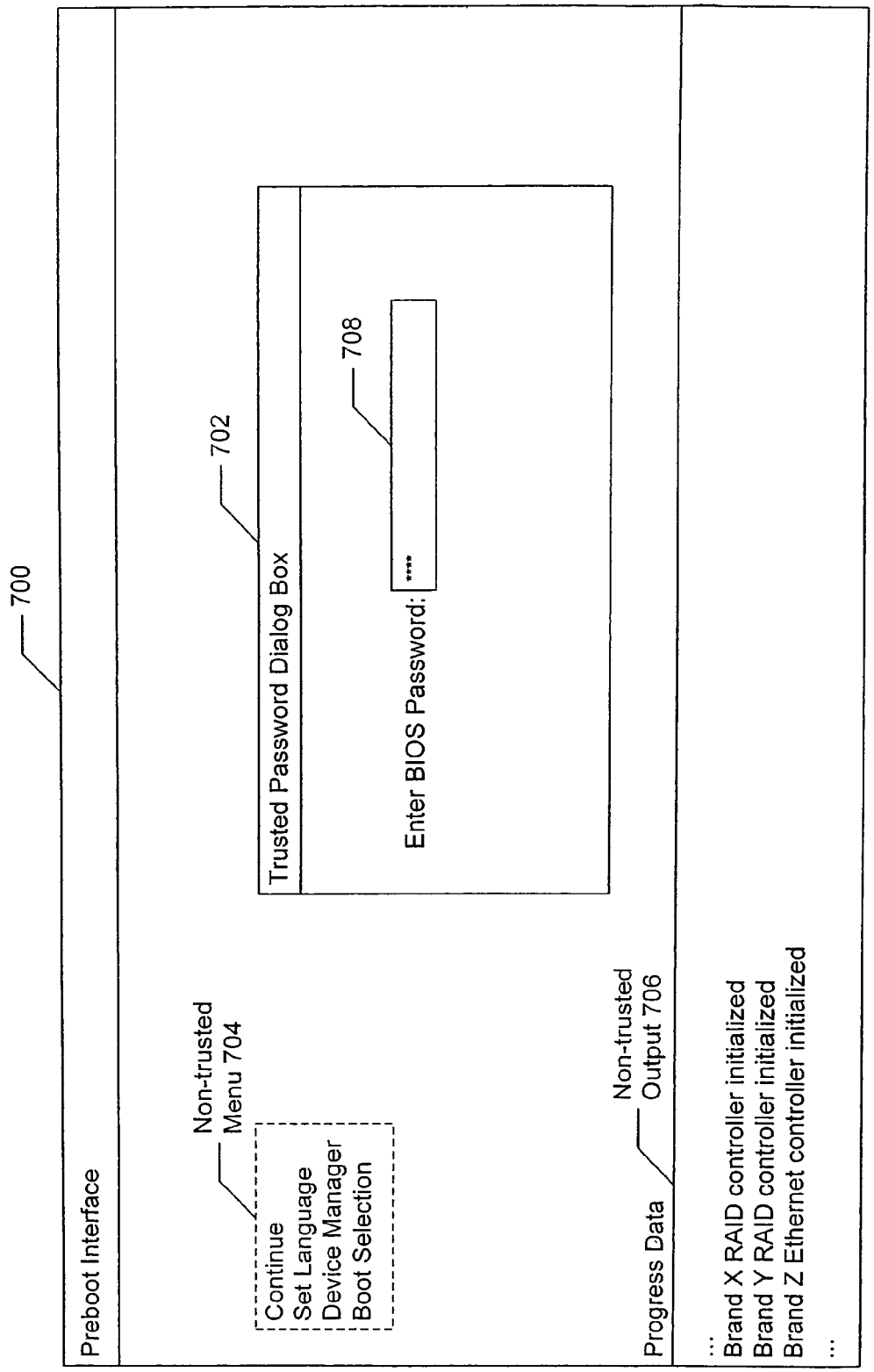
FIG. 7 is a screen diagram of an example of pre-boot user interface including a trusted password dialog box and other non-trusted agents.

When executed, the trusted password collection routine may call (directly or indirectly) a trusted graphics routine to "draw" a password collection dialog box (block 512). Similarly, the trusted graphics routine may call a trusted display driver to display the password collection dialog box on a display device (block 514). An example, password collection dialog box 702 is illustrated in FIG. 7. The trusted path is such that any graphics routine "drawn" in this manner will overlay graphics drawn by non-trusted agents. This prohibits a Trojan application from masquerading as the password entry prompt.

In addition to trusted interface objects, the pre-boot environment may include non-trusted interface objects. For example, most computer systems 300 are capable of loading a legacy based display driver, a basic keyboard driver, a hard disk driver, and a network interface driver prior to loading a full operating system such as a version of Microsoft Windows®. Enabling input and output devices prior to booting a full operating system allows an operator to diagnose problems, manipulate settings, and perform other operations without the operating system being fully loaded. In the example illustrated in FIG. 7, a non-trusted menu 704 and a non-trusted output area 706 are shown. These non-trusted interface objects may use third party software routines and/or device drivers. Accordingly, both trusted and non-trusted interface objects may be used in the same pre-boot interface 700.

The example password collection dialog box 702 includes a text input box 708. Accordingly, the process 500 executes a trusted keyboard to receive the password (block 516). If the password matches a password stored in the secure memory area 602, the process 500 allows certain operations to be performed in the pre-boot environment (block 518). For example, the process 500 may allow the non-trusted pre-boot setup environment to be used. When the pre-boot environment is exited, the process 500 continues to boot the computer system 300 by loading the full operating system (block 520).

Although the above discloses example systems including, among other components, software executed on hardware, it should be noted that such systems are merely illustrative and should not be considered as limiting. For example, it is contemplated that any or all of the disclosed hardware and software components could be embodied exclusively in dedicated hardware, exclusively in software, exclusively in firmware or in some combination of hardware, firmware and/or software.

In addition, although certain methods, apparatus, and articles of manufacture have been described herein, the scope of coverage of this patent is not limited thereto. On the contrary, this patent covers all apparatuses, methods and articles of manufacture fairly falling within the scope of the appended claims either literally or under the doctrine of equivalents.

What is claimed is:

1. A method of receiving a password, the method comprising:
   receiving a password routine, the password routine being digitally signed using a private key;
   authenticating the password routine using a public key associated with the private key;
   storing the password routine in a first area of a memory device, the first area of the memory device being unavailable to a memory management unit, the memory device including a second area, the second area being available to the memory management unit;
   executing a monitor routine at a first privilege level to secure a pre-boot environment; and
   executing the password routine at a second privilege level in the pre-boot environment to receive the password, wherein the first and second privilege levels are different.

2. A method as defined in claim 1, further comprising executing a non-trusted device driver in the pre-boot environment.

3. A method as defined in claim 2, wherein the non-trusted device driver is only executed if the password matches a password stored in the first area of the memory device.

4. A method as defined in claim 3, wherein the non-trusted device driver is stored in the second area of the memory device.

5. A method as defined in claim 1, wherein executing the password routine comprises executing the password routine using a processor in a secure mode, the secure mode being a hardware feature of the processor.

6. A method as defined in claim 5, wherein the secure mode limits the use of input hardware.

7. A method as defined in claim 6, wherein the secure mode limits the use of output hardware.

8. A method as defined in claim 1, wherein the password routine calls a trusted graphics routine, the trusted graphics routine being digitally signed.

9. A method as defined in claim 8, wherein the trusted graphics routine calls a trusted display driver, the trusted display driver being digitally signed.

10. A method as defined in claim 1, wherein the password routine calls a trusted keyboard driver, the trusted keyboard driver being digitally signed.

11. A method as defined in claim 1, wherein the password comprises a basic input output system (BIOS) password.

12. An apparatus to execute a trusted software program in a pre-boot environment, the apparatus comprising:
   a memory device including a first memory portion and a second memory portion, the first memory portion storing the trusted software program;
   a memory management unit operatively coupled to the memory device, the memory management unit being unable to access the first memory portion, the memory management unit being able to access the second memory portion; and
   a processor operatively coupled to the memory device, the processor to execute the trusted software program in the pre-boot environment, wherein the processor is configured to secure an address of the memory device to prevent another software program from accessing the first memory portion during execution of the trusted software program.

13. An apparatus as defined in claim 12, further comprising a non-trusted software program stored in the second memory portion.

14. An apparatus as defined in claim 13, wherein the processor executes the non-trusted software program in the pre-boot environment.

15. An apparatus as defined in claim 12, wherein the trusted software program comprises a hardware driver.

16. An apparatus as defined in claim 15, wherein the hardware driver comprises a keyboard driver.

17. An apparatus as defined in claim 15, wherein the hardware driver comprises a display driver.

18. An apparatus as defined in claim 12, wherein the trusted software program comprises a graphical user interface display routine.

19. An apparatus as defined in claim 12, wherein the trusted software program comprises a password collection routine.

20. An apparatus as defined in claim 12, wherein the processor includes a secure mode that limits the use of input hardware and output hardware connected to the processor.

21. An apparatus as defined in claim 20, wherein the processor executes the trusted software program in the pre-boot environment while the processor is in the secure mode.

22. An apparatus to collect a password in a pre-boot environment, the apparatus comprising:
   a memory device including a first memory portion and a second memory portion, the second memory portion storing a keyboard driver, a display driver, graphics routine, and a password collection routine;
   a memory management unit operatively coupled to the memory device, the memory management unit being able to access the first memory portion, the memory management unit being unable to access the second memory portion; and a processor operatively coupled to the memory device, the processor to execute a monitor routine at a first privilege level to secure the pre-boot environment and to execute the keyboard driver, the display driver, the graphics routine, and the password collection routine at a second privilege level in the pre-boot environment to collect the password in the pre-boot environment, wherein the first and second privilege levels are different.

23. An apparatus as defined in claim 22, wherein the keyboard driver, the display driver, the graphics routine, and the password collection routine are each authenticated using a digital signature.

24. An apparatus as defined in claim 22, wherein the processor includes a secure mode that limits the use of input hardware and output hardware connected to the processor.

25. An apparatus as defined in claim 24, wherein the processor executes the keyboard driver, the display driver, the graphics routine, and the password collection routine in the pre-boot environment while the processor is in the secure mode.

26. A machine readable medium storing instructions structured to cause a machine to:

receive a password routine, the password routine being digitally signed using a private key;

authenticate the password routine using a public key associated with the private key;

store the password routine in a first area of a memory device, the first area of the memory device being unavailable to a memory management unit, the memory device including a second area, the second area being available to the memory management unit;

execute the password routine in a pre-boot environment to receive the password; and secure an address of the memory device to prevent another software program from accessing the first area of the memory device during execution of the password routine.

27. A machine readable medium as defined in claim 26, wherein the instructions are structured to cause the machine to executing a non-trusted software routine in the pre-boot environment, the non-trusted software routine being stored in the second area of the memory device.

28. A machine readable medium as defined in claim 27, wherein the non-trusted software routine comprises a legacy driver.

* * * * *